(12) United States Patent
Lipcsei et al.

(10) Patent No.: US 7,816,896 B2
(45) Date of Patent: Oct. 19, 2010

(54) CIRCUITS AND METHODS FOR CONTROLLING A CONVERTER

(75) Inventors: Laszlo Lipcsei, Campbell, CA (US);
Serban Popescu, Campbell, CA (US);
ChengHwa Teh, The Rivervale (SG)

(73) Assignee: 02Micro International Limited, Grand Cayman (KY)

( * ) Notice: Subject to any disclaimer, the term of this patent is extended or adjusted under 35 U.S.C. 154(b) by 355 days.

(21) Appl. No.: 11/901,065

(22) Filed: Sep. 14, 2007

(65) Prior Publication Data

US 2008/0101102 A1  May 1, 2008

Related U.S. Application Data

(60) Provisional application No. 60/854,487, filed on Oct. 25, 2006.

(51) Int. Cl.
*G05F 1/40* (2006.01)

(52) U.S. Cl. .................................................... 323/271
(58) Field of Classification Search .......... 323/222–225, 323/268, 271, 282, 349–351
See application file for complete search history.

(56) References Cited

U.S. PATENT DOCUMENTS

| 6,060,868 | A  | * | 5/2000 | Mazzorin ..................... 323/224 |
| 6,642,697 | B2 | * | 11/2003 | Zuniga et al. ............... 323/223 |
| 6,791,306 | B2 |   | 9/2004 | Walters et al. .............. 323/288 |
| 7,646,179 | B2 | * | 1/2010 | Hagino ....................... 323/222 |

* cited by examiner

*Primary Examiner*—Matthew V Nguyen

(57) ABSTRACT

Circuits and methods for controlling a converter are disclosed. A first switch within the converter can be turned off, and a second switch within the converter alternately can be turned on and off in response to a switch control signal while the first switch is turned off. By turning the second switch alternately on and off, energy stored in the converter can be recovered to a power source of the converter.

12 Claims, 9 Drawing Sheets

CIRCUITS AND METHODS FOR CONTROLLING A CONVERTER

RELATED APPLICATION

This application claims priority to U.S. Provisional Application No. 60/854,487, filed on Oct. 25, 2006, the specification of which is hereby incorporated in its entirety by reference.

BACKGROUND

1. Field

The present invention relates to converters, and more particularly to circuits and methods for controlling a converter.

2. Description of the Related Art

Converters are currently widely used in electronic systems for providing regulated power supplies. Typically, converters employ a structure of a switch-mode power supply to achieve higher efficiency, smaller size or lighter weight. There exists a variety of converters, such as a buck converter, a boost converter, and a buck/boost converter.

FIG. 1 illustrates a schematic diagram of a conventional converter circuit 100. In general, the converter circuit 100 converts an input voltage VIN from a power source (e.g., a battery 130) to a regulated output voltage VOUT. For example, the converter circuit 100 may include a buck converter 110 and a controller 120. The buck converter 110 may further include a first switch 102, a second switch 104, an inductor 106 and an output capacitor 108. The first switch 102 is typically coupled to the battery 130 and thus is referred to as a high side switch. The second switch 104 is typically coupled to ground and thus is referred to as a low side switch. In operation, the controller 120 turns the first and second switches 102 and 104 alternately on or off, thereby producing the regulated output voltage VOUT at the output capacitor 108. The controller 120 typically generates pulse width modulated (PWM) signals to control the conduction status of the first and second switches 102 and 104. A duty ratio of the PWM signals determines a voltage level of the output voltage VOUT.

However, the buck converter 110 faces power loss and low efficiency during a shutdown process. For instance, when both the first and second switches 102 and 104 are turned off, the shutdown process starts. During the shutdown process, energy retained in the output capacitor 108 will be discharged through a load (not shown), which is generally coupled in parallel with the output capacitor 108 and in high impedance. As such, power efficiency of the buck converter 110 is degraded and the running time of the battery 130 is shortened. Additionally, because the load is generally in high impedance, there will be a long shutdown process.

FIG. 2 illustrates a schematic diagram of another conventional converter circuit 200. Elements labeled the same in FIG. 1 have similar functions and will not be repetitively described herein for purposes of brevity and clarity. In FIG. 2, the output of the buck converter 110 is coupled to a resistive load 230, which is further coupled to ground via a discharge switch 240. The conduction state of the discharge switch 240 is controlled by a discharge signal 250 asserted by a controller 220. During the shutdown process, the discharge switch 240 is turned on such that the energy retained in the output capacitor 108 can be discharged through the resistive load 230. Though the shutdown process is shortened significantly, the drawbacks regarding power loss and low efficiency still exist.

Another traditional method of shutting a converter down is to ramp down the output voltage VOUT to zero in a controlled manner. For example, the controller operates in a closed loop to cause the output voltage VOUT in relation to an internal reference voltage. When the converter is shut down, the internal reference voltage ramps gradually down to zero, thereby adjusting the duty ratio of the PWM signals. As such, the first and second switches are still turned alternately on or off by the PWM signals during the shutdown process but the output voltage VOUT ramps gradually down to zero due to the dynamically adjusted duty ratio of the PWM signals. In this instance, if there is no load present during the shutdown process, the energy retained in the output capacitor can be brought back to the power source. However, energy transfer from the power source to the converter still happens via the first and second switches. In particular, if there is a load present at the output of the converter during the shutdown process, there will be energy dissipation in the load. The efficiency of the converter circuit is further reduced due to a high switching frequency of the first and second switches during the shutdown process.

SUMMARY

Embodiments in accordance with the present invention provide circuits and methods for controlling a converter. In one embodiment, a first switch within the converter is turned off, and a second switch within the converter is alternately turned on and off in response to a switch control signal while the first switch is turned off. By turning the second switch alternately on and off, energy stored in the converter can be recovered to a power source of the converter.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
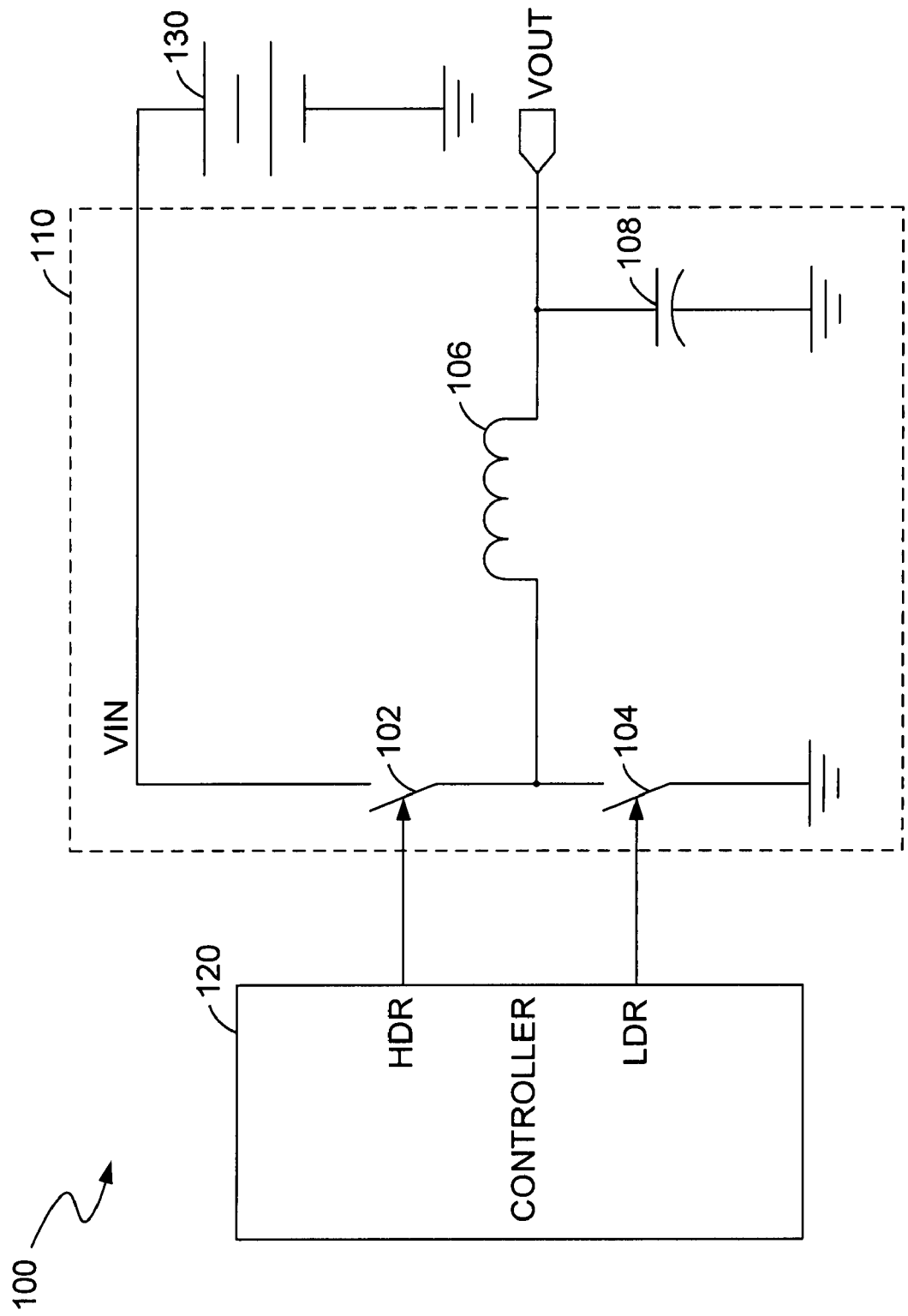
FIG. 1 is a schematic diagram of a conventional converter circuit.
Figure 2:
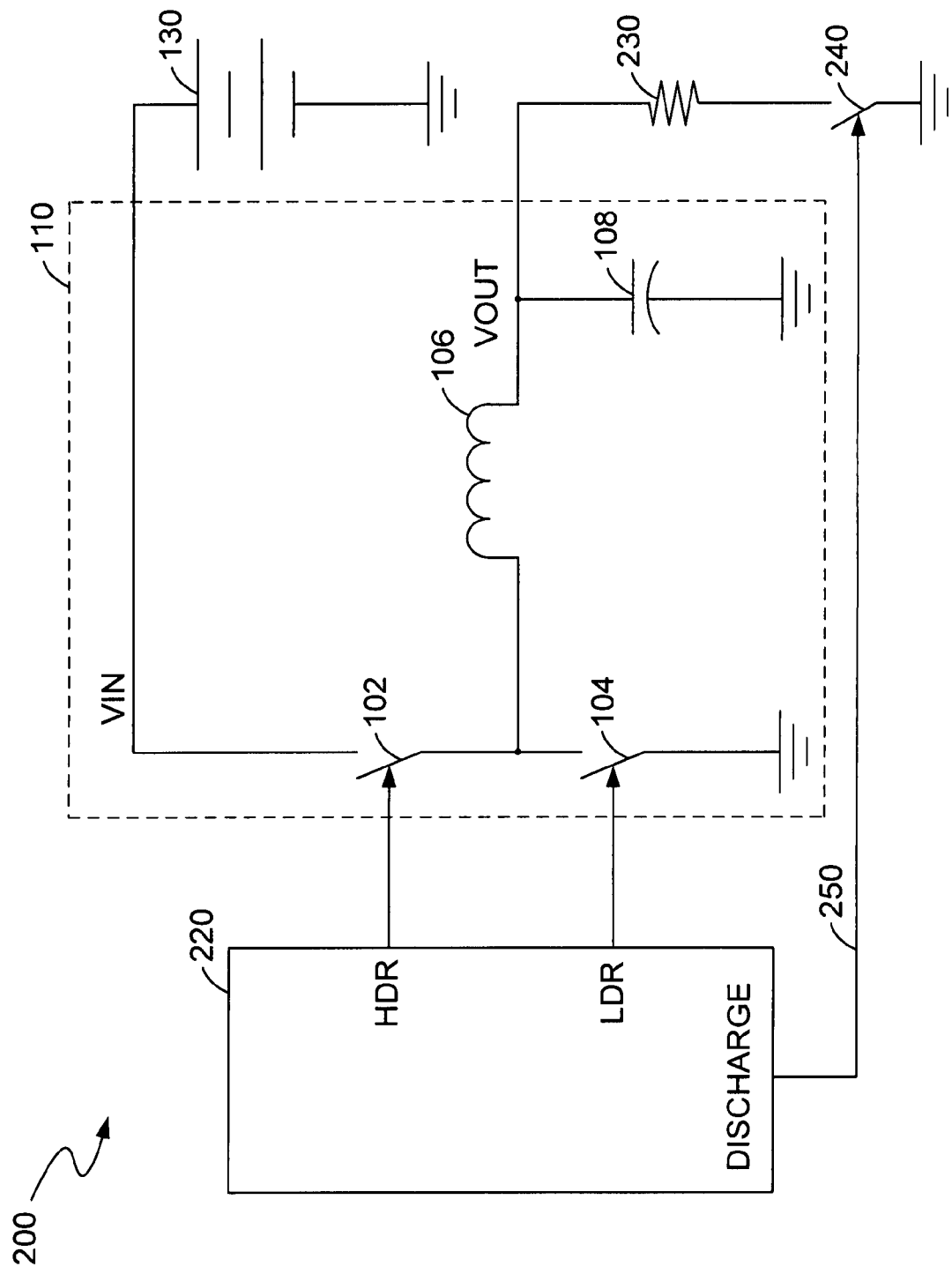
FIG. 2 is a schematic diagram of another conventional converter circuit.
Figure 3:
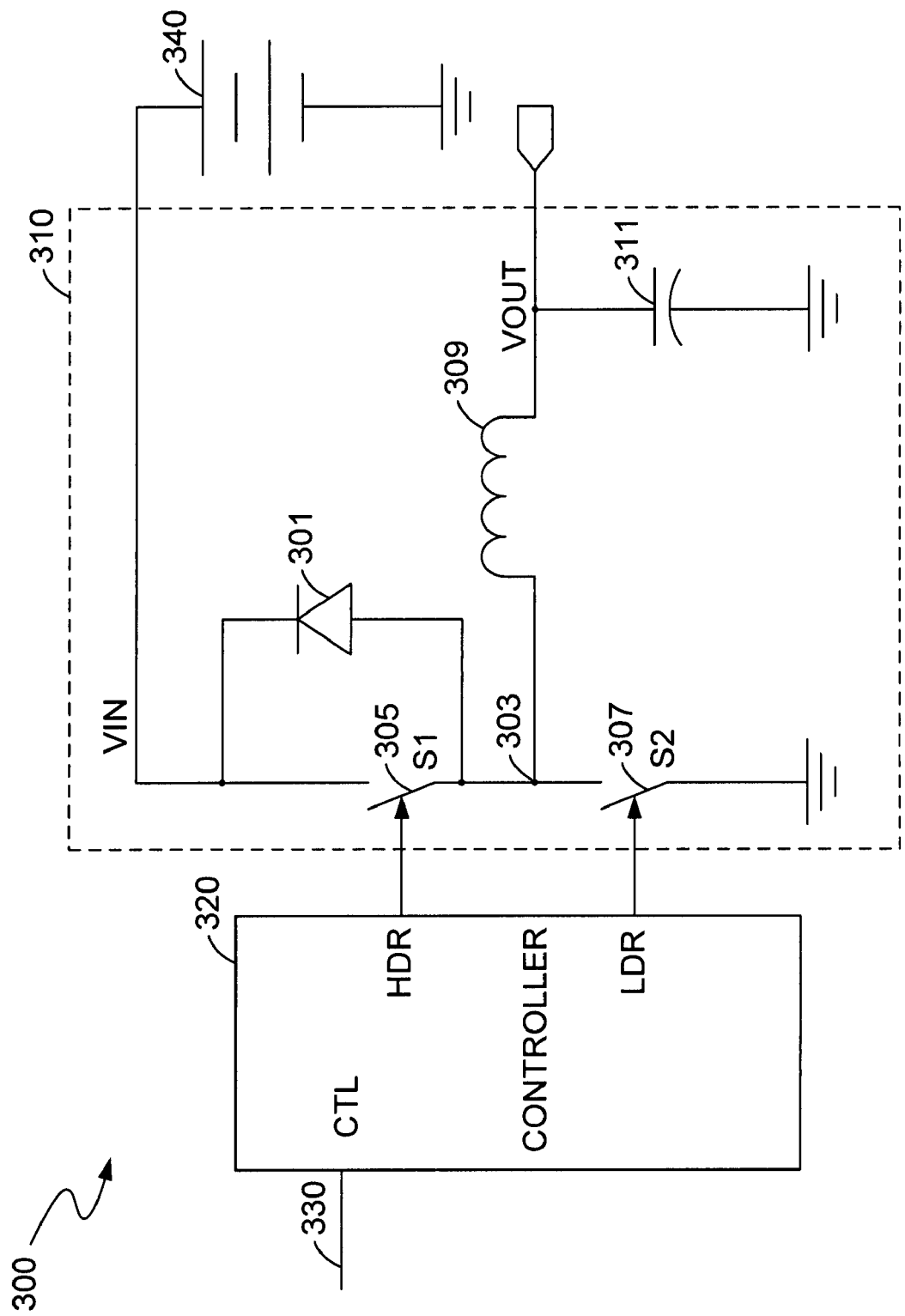
FIG. 3 is a schematic diagram of a converter circuit according to one embodiment of the present invention.

FIG. 3 illustrates a schematic diagram of a converter circuit 300 according to one embodiment of the present invention. As an example, the converter circuit 300 may include a buck converter 310, a controller 320 and a power source, e.g., a battery 340. The buck converter 310 may include a first switch (S1) 305, a second switch (S2) 307, an inductor 309, an output capacitor 311. The first and second switches 305 and 307 are coupled in series between the battery 340 and ground. The inductor 309 is coupled to a junction node 303 of the first and second switches 305 and 307. The output capacitor 311 is coupled between the inductor 309 and ground for supplying an output voltage VOUT. Furthermore, the converter 310 may further include a switching device, e.g., a diode 301, coupled in parallel with the first switch 305. The controller 320 may include an input terminal CTL for receiving a control signal 330. In response to the control signal 330, the controller 320 can instruct the buck converter 310 to operate in either a normal operation mode or a shutdown mode.

In one embodiment, the control signal 330 is set to logic 1 to enable the normal operation mode, where the first and second switches 305 and 307 are turned on or off alternately to achieve the regulated output voltage VOUT. The state when the first switch 305 is turned on and the second switch 307 is turned off is referred to as an ON state of the buck converter 310. In the ON state, current will flow from the battery 340 towards the output capacitor 311, sequentially through the first switch 305 and the inductor 309. Also, the inductor 309 is coupled to the battery 340 to store energy. Furthermore, when a load is coupled to the output of buck converter 310, energy can be transferred directly from the battery 340 to the load, in one embodiment. In contrast, the state when the first switch 305 is turned off and the second switch 307 is turned on is referred to as an OFF state of the buck converter 310. In the OFF state, the inductor 309 maintains the inductor current in the same direction as in the ON state. Current will flow from ground towards the output capacitor 311, sequentially through the second switch 307 and the inductor 309. Also, energy stored in the inductor 309 will be discharged to the output capacitor 311. Furthermore, when a load is coupled to the output of buck converter 310, energy is also discharged to the load, in one embodiment.

In one embodiment, the control signal 330 is set to logic 0 to enable the shutdown mode, where the first switch 305 remains off and the second switch 307 is turned on and off alternately. In the shutdown mode, the first switch 305 remains off such that the diode 301, the second switch 307, the inductor 309 and the output capacitor 311 form a power stage of a boost converter to realize energy recovery from the output capacitor 311 to the battery 340. Meanwhile, energy transfer from the battery 340 to the output capacitor 311 is terminated by the diode 301 and the first switch 305. The following sections will describe these features of the shutdown mode in detail.

When the first switch 305 is turned off and the second switch 307 is turned on, the diode 301 will be reverse-biased to cut off energy transfer path from the battery 340 to the output capacitor 311. Meanwhile, current will flow from the output capacitor 311 towards ground, sequentially through the inductor 309 and the second switch 307. In this instance, the output capacitor 311 acts like a power source of a boost converter to transfer the stored energy to the inductor 309. When both the first switch 305 and the second switch 307 are turned off, the inductor 309 maintains the inductor current in the same direction, resulting in an increased voltage at the junction node 303 to forward-bias the diode 301. As a result, current will flow from the output capacitor 311 towards the battery 340, sequentially through the inductor 309 and the forward-biased diode 301. In this instance, the battery 340 acts like a load to receive energy discharged by the inductor 309 via the forward-biased diode 301. Also, the energy stored in the output capacitor 311 can be transferred to the battery 340 directly via the forward-biased diode 301. In conclusion, energy transfer from the battery 340 to the output capacitor 311 is terminated by the reverse-biased diode 301 and energy stored in the output capacitor 311 is recovered to the battery 340 via the forward-biased diode 301.

Furthermore, even if a load is coupled to the output of the buck converter 310 in the shutdown mode, no energy is delivered from the battery 340 to the load due to the reverse-biased diode 301 and energy recovery from the output capacitor 311 to the battery 340 still happens, in one embodiment.

In addition, instead of employing the diode 301 coupled in parallel with the first switch 305, an intrinsic body diode of the first switch 305 can also be utilized to realize those features of the shutdown mode as discussed above. For example, the first switch 305 may be constructed of a metal-oxide-semiconductor field-effect-transistor (MOSFET), whose body diode can be reverse-biased to terminate energy transfer from the battery 340 to the output capacitor 311 and be forward-biased to recover energy from the output capacitor 311 to the battery 340.

Since the energy stored in the buck converter 310 can be recovered to the battery 340 in the shutdown mode, the power efficiency of the buck converter 310 is enhanced significantly. Furthermore, when there is a load coupled to the output of the buck converter 310, energy transfer from the battery 340 to the load is terminated in the shutdown mode such that there is no power dissipation in the load. As a result, the power efficiency is further increased.

Figure 4:
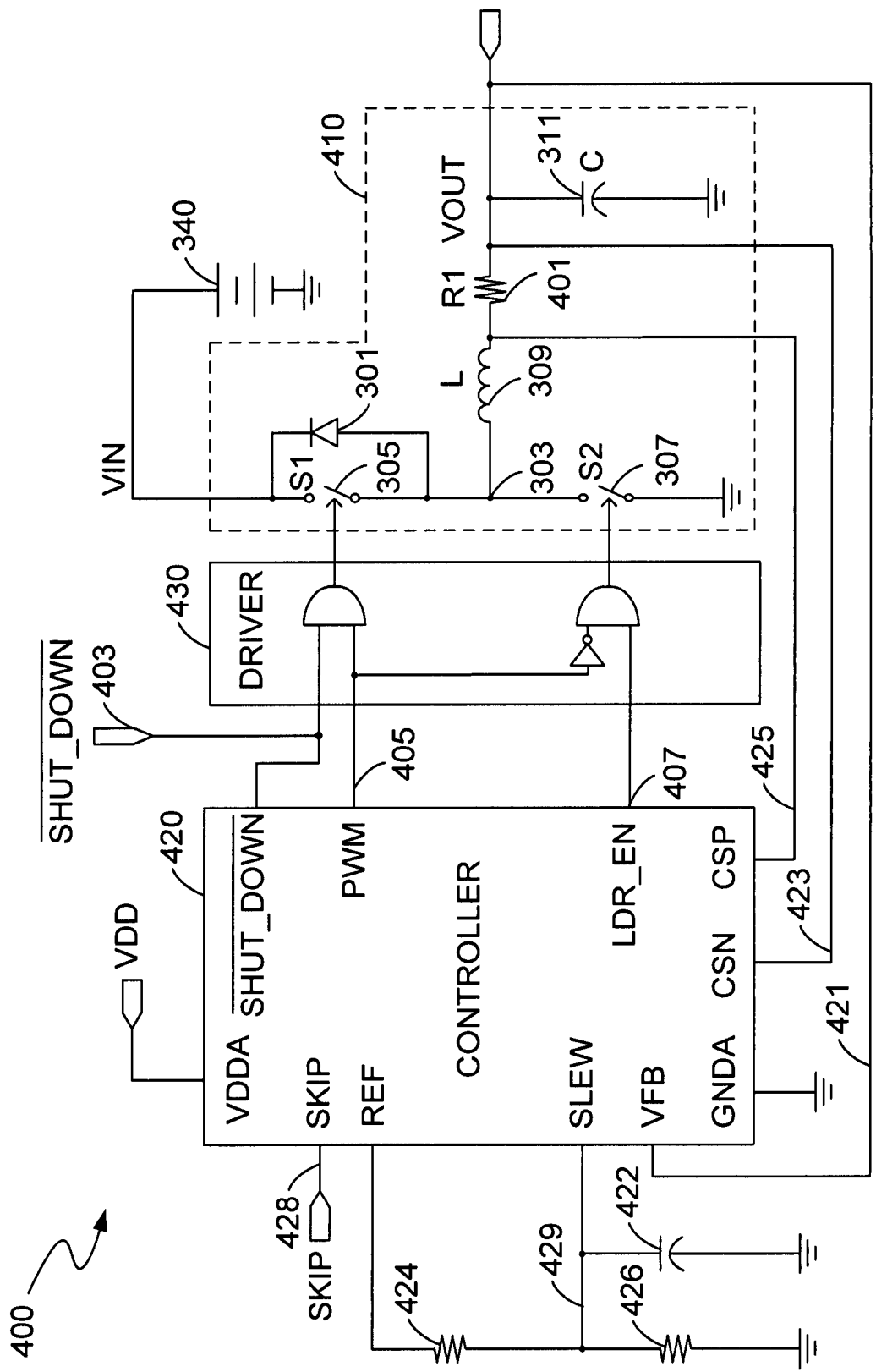
FIG. 4 is a schematic diagram of a converter circuit according to another embodiment of the present invention.

FIG. 4 illustrates a schematic diagram of a converter circuit 400 according to another embodiment of the present invention. Elements labeled the same in FIG. 3 have similar functions and will not be described herein for brevity and clarity. The converter circuit 400 includes a buck converter 410, a controller 420 and a driver 430. The controller 420 herein operates together with the driver 430 to control operation of the buck converter 410.

In one embodiment, the controller 420 is configured to provide a PWM signal 405 and a LDR_EN signal 407 to the driver 430. The PWM signal 405 and the LDR_EN signal 407 are generated in response to a number of input signals of the controller 420. For example, the controller 420 may receive a slew signal 429 representative of a target voltage level Vslew of the output voltage VOUT at a SLEW terminal. In the exemplary embodiment of FIG. 4, the slew signal 429 is generated by charging a slew capacitor 422 coupled between the SLEW terminal and ground. The slew capacitor 422 is herein charged by a reference voltage Vref at a REF terminal and a voltage divider formed by resistors 424 and 426. Also, various ways may be employed herein to charge the slew capacitor 422 and create the slew signal 429 representative of the target voltage level Vslew. The controller 420 may further receive feedback signals 423 and 425 representative of the inductor current at terminals CSN and CSP, respectively. The feedback signals 423 and 425 are herein sensed by an optional sense resistor 401 coupled in series with the inductor 309. Based on these feedback signals 423 and 425, an over-current condition of the inductor 309 may be detected by the controller 420. Moreover, the controller 420 can receive a feedback signal 421 representative of the output voltage VOUT at a VFB terminal, a skip signal 428 at a SKIP terminal, a shutdown signal 403 at a SHUTDOWN terminal, which will be described in detail in the following sections.

In addition to the PWM signal 405 and the LDR_EN signal 407 provided by the controller 420, the driver 430 further receives the shutdown signal 403. In response to the shutdown signal 403, the driver 430 enables the buck converter 410 to operate in either a normal operation mode or a shutdown mode.

Figure 5:
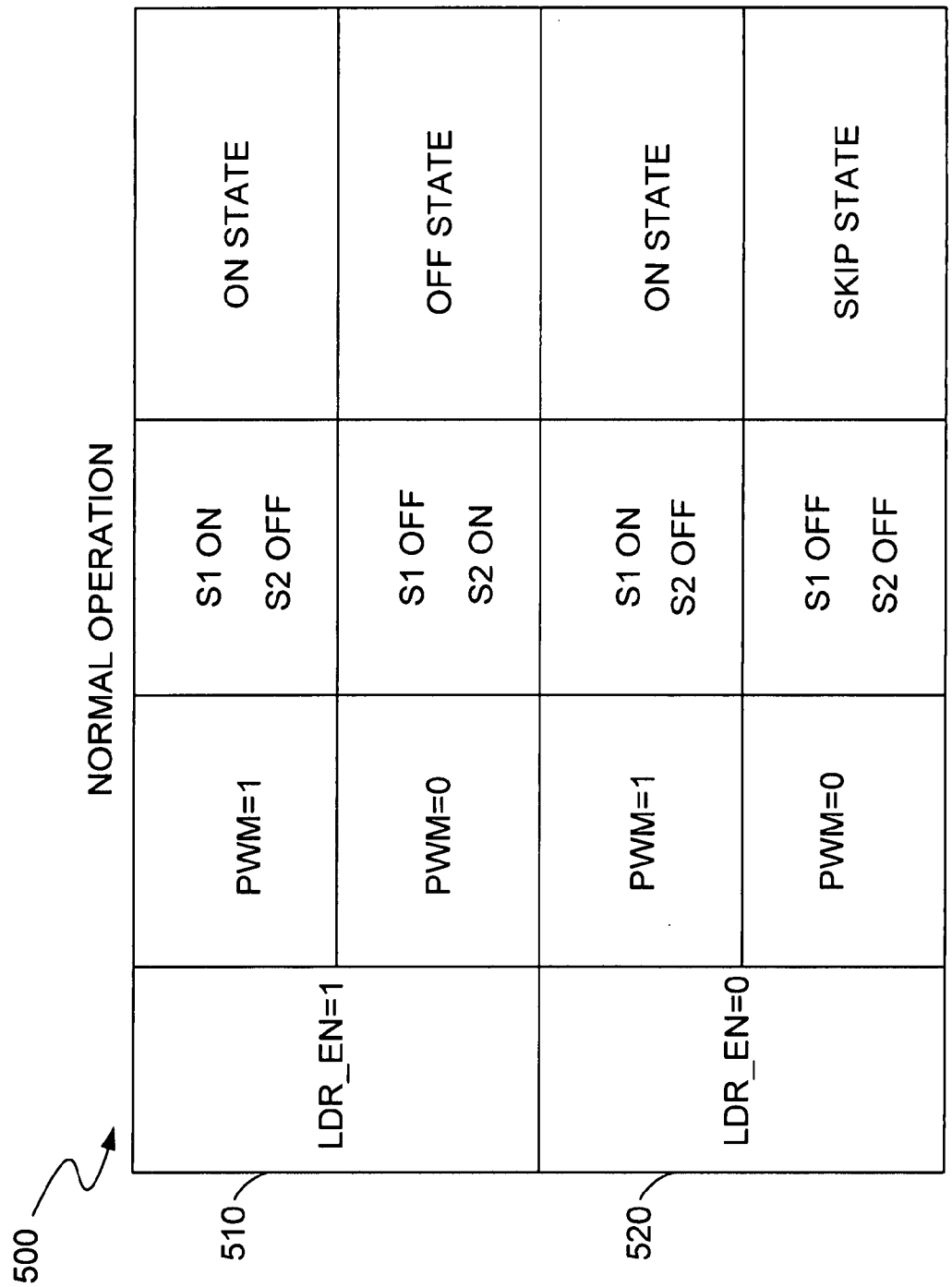
FIG. 5 is an exemplary table illustrating switch conduction states in the normal operation mode according to one embodiment of the present invention.

Turning to FIG. 5, an exemplary table 500 illustrating various conduction states of the first and second switches 305 and 307 in the normal operation mode is represented. In one embodiment, the normal operation mode is enabled by setting the shutdown signal 403 to logic 1. If the LDR_EN signal 407 is logic 1 as in category 510 of the table 500, the state of the PWM signal 405 controls the first and second switches 305 and 307. For instance, when the PWM signal 405 is logic 1, the first switch 305 is turned on and the second switch 307 is turned off, which is referred to as an ON state of the buck converter 410. When the PWM signal 405 is logic 0, the first switch 305 is turned off and the second switch 307 is turned on, which is referred to as an OFF state of the buck converter 410.

In contrast, if the LDR_EN signal 407 is logic 0 as in category 520 of the table 500, the second switch 307 will remain off. In this instance, when the PWM signal 405 is logic 1, the first switch 305 is turned on and the second switch 307 is turned off such that the buck converter 410 operates in the ON state. When the PWM signal 405 is logic 0, both the first switch 305 and the second switch 307 are turned off such that the buck converter 410 operates in a skip state. In the skip state, the junction node 303 at a switching side of the inductor 309 will be left floating.

In the normal operation mode, the inductor 309 is alternately coupled to the battery 340 or ground depending on the conduction state of the first and second switches 305 and 307 (ON or OFF state of the buck converter 410). During the ON state, the inductor 309 is coupled to the battery 340 for receiving the input voltage VIN. Neglecting the voltage drop across the sense resistor 401 which has a low resistance, the voltage across the inductor 309 is equal to VIN−VOUT. For the buck converter 410, the input voltage VIN is necessarily larger than the output voltage VOUT such that there is a net positive voltage across the inductor 309 and the inductor current ramps up according to equation 1) during the ON state.

$$di/dt = (VIN - VOUT)/L = \Delta I / TON \quad 1)$$

In equation 1), TON is the time interval of the ON state, ΔI is the current change during the TON time interval and L is the inductance of the inductor 309.

During the OFF state, the voltage across the inductor 309 is equal to VOUT. However, in this instance, there is a net negative voltage across the inductor 309 such that the inductor current ramps down according to equation 2) during the OFF state.

$$di/dt = (-VOUT)/L = \Delta I / TOFF \quad 2)$$

In equation 2), TOFF is the time interval of the OFF state, ΔI is the current change during the TOFF time interval and L is the inductance of the inductor 309.

In terms of energy transfer, during the ON state of the normal operation mode, energy is transferred from the battery 340 to the inductor 309 and the output capacitor 311. Furthermore, if there is a load (not shown) coupled to the output of the buck converter 410, energy is delivered from the battery 340 to the load directly. During the OFF state of the normal operation mode, energy stored in the inductor 309 is further released to the output capacitor 311. Furthermore, if there is a load (not shown) coupled to the output of the buck converter 410, energy is also released from the inductor 309 to the load. In summary, during the normal operation mode, energy is transferred from the battery 340 to the buck converter 410.

Figure 6:
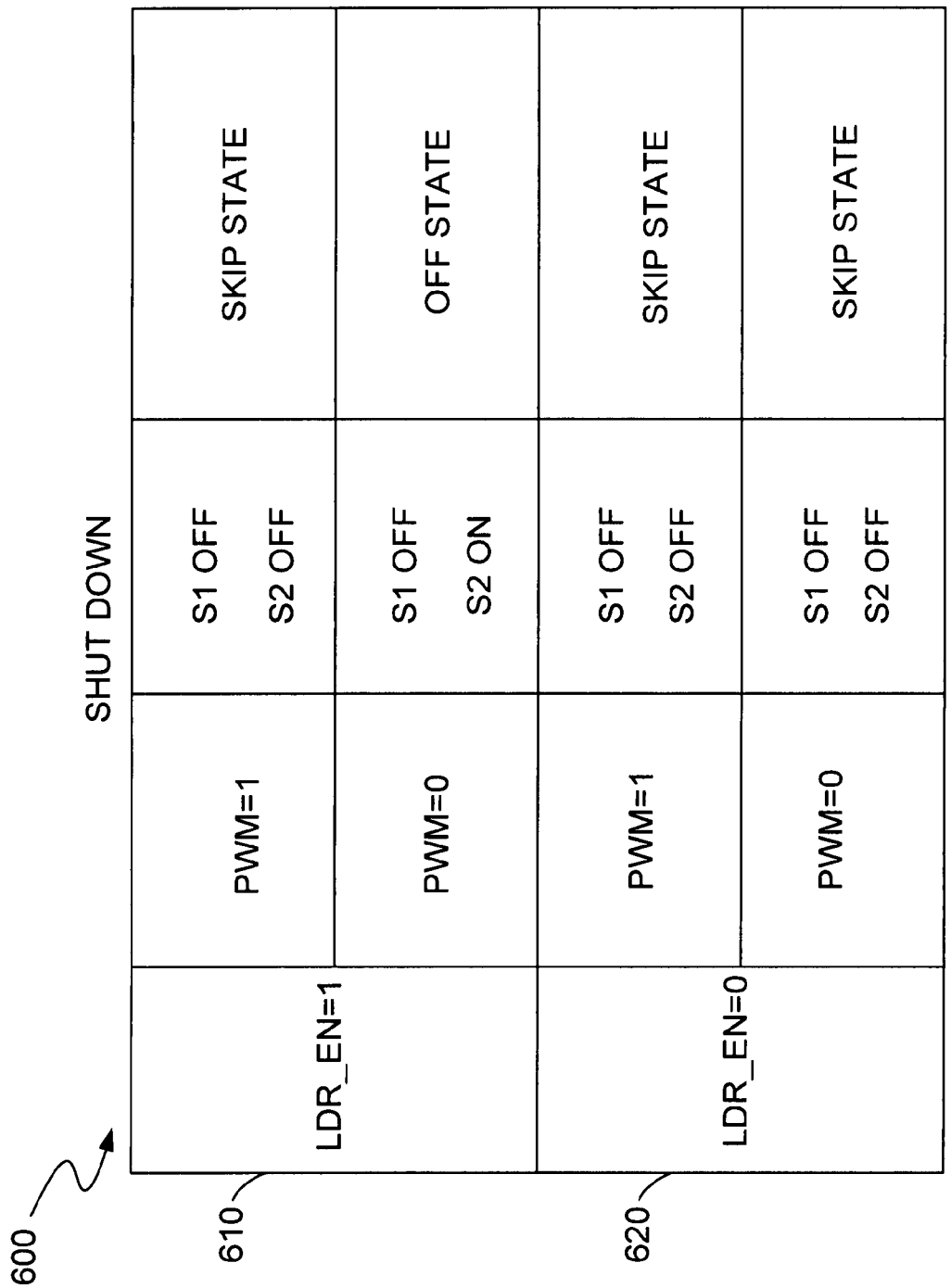
FIG. 6 is an exemplary table illustrating switch conduction states in the shutdown mode according to one embodiment of the present invention.

Turing to FIG. 6, an exemplary table 600 illustrating various conduction states of the first and second switches 305 and 307 in the shutdown mode is represented. In one embodiment, the shut down mode is enabled by setting the shutdown signal 403 to logic 0. If the LDR_EN signal 407 is logic 1 as in category 610 of the table 600, the first switch 305 remains off and the second switch 307 switches alternately on and off following the PWM signal 405. As such, the buck converter 410 switches between the skip state and the OFF state alternately. In this instance, the diode 301, the second switch 307, the inductor 309 and the output capacitor 311 form a power stage of a boost converter to realize energy recovery from the output capacitor 311 to the battery 340.

During the skip state, the diode 301 is forward-biased and the current flows from the output capacitor 311 towards the battery 340 and ramps down according to equation 3).

$$di/dt = (VOUT - VIN)/L = \Delta I / TSKIP \quad 3)$$

In equation 3), TSKIP is the time interval of the skip state, ΔI is the current change during the TSKIP time interval, and L is the inductance of the inductor 309. Furthermore, when the voltage VD across the diode 301 is taken into account, the current will ramp down according to equation 4).

$$di/dt = (VOUT - VIN - VD)/L < \Delta I / TSKIP \quad 4)$$

According to equation 4), the current will ramp down to zero before the TSKIP time interval expires.

During the OFF state, the diode 301 is reverse-biased and the current flows from the output capacitor 311 towards ground and ramps up according to equation 5).

$$di/dt = VOUT/L = \Delta I / TOFF \quad 5)$$

In equation 5), TOFF is the time interval of the OFF state, ΔI is the current change during the TOFF time interval, and L is the inductance of the inductor 309.

In terms of energy transfer, during the OFF state of the buck converter 410, energy stored in the output capacitor 311 is transferred to the inductor 309. Energy transfer from the battery 340 to the buck converter 410 is terminated due to the reverse-biased diode 301. During the skip state of the buck converter 410, energy stored in the inductor 309 and the output capacitor 311 will be recovered to the battery 340 due to the forward-biased diode 301.

In addition, if the LDR_EN signal 407 is logic 0 as in category 620 of the table 600, both the first switch 305 and the second switch 307 remain off. As such, the buck converter 410 is always in the skip state.

Figure 7:
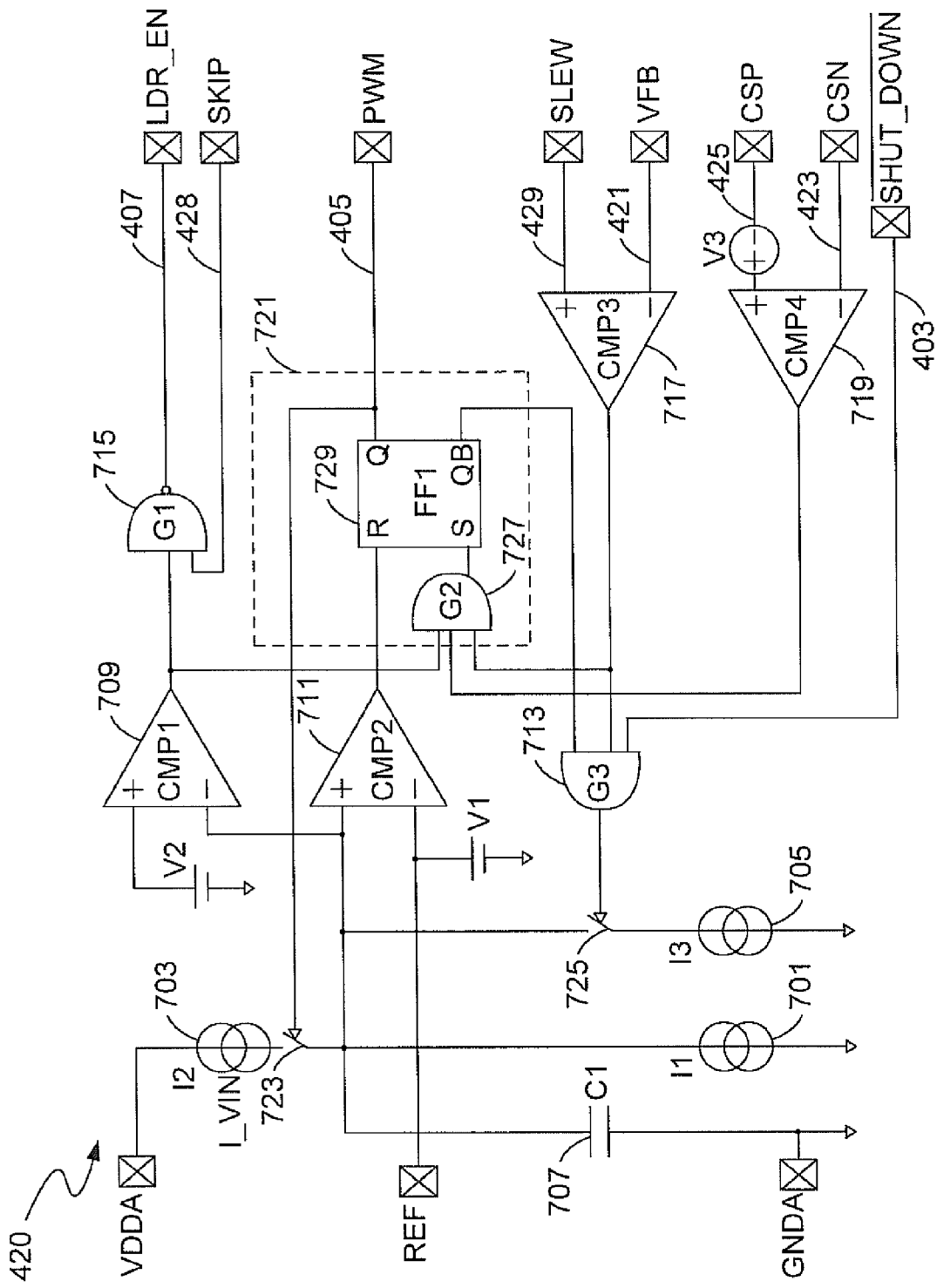
FIG. 7 is a schematic diagram of a converter controller according to one embodiment of the present invention.

FIG. 7 illustrates a schematic diagram of the controller 420 in FIG. 4 according to one embodiment of the present invention. FIG. 7 is herein described in combination with FIG. 4. The controller 420 includes a first current source 701, a second current source 703, a third current source 705, an energy storage element 707 (e.g., a capacitor C1), an AND gate 713, a NAND gate 715, comparators 709, 711, 717 and 719, a PWM signal generator 721, and switches 723 and 725. The PWM signal generator 721 may further include an AND gate 727 and a flip-flop 729. The first current source 701 provides a current I1 representative of the output voltage VOUT or the target voltage level Vslew. The second current source 703 provides a current I2 representative of the input voltage VIN. The third current source 705 provides a current I3 representative of the output voltage VOUT. In one embodiment, the current I3 is greater than the current I1. For example, I3 is set to be ten times I1. The current I3 helps to filter out the parasitic triggering of a new PWM pulse. However, the current I3 is not mandatory.

As illustrated in FIG. 7, the storage element 707 is coupled to the current sources 701 and 703 and can be charged and discharged alternately according to the conduction status of the switch 723. The conduction status of the switch 723 is further controlled by the PWM signal 405. The storage element 707 is also coupled to the current source 705 via the switch 725. An output signal of the AND gate 713 controls the conduction status of the switch 725, thereby enabling or disabling an accelerated discharge process of the storage element 707. The output signal of the AND gate 713 is determined by an output at a QB terminal of the flip-flop 729, a comparing result of the comparator 717 and the shutdown signal 403. The comparator 717 compares the slew signal 429 at the SLEW terminal with the feedback signal 421 at the VFB terminal. The comparator 719 compares the feedback signal 423 at the CSN terminal with the feedback signal 425 at the CSP terminal, thereby sensing the over current condition of the inductor 106. Also, an offset voltage V3 is added to the feedback signal 425 for defining a triggered threshold. Moreover, the voltage across the storage element 707 is compared with a first nominal threshold voltage V1 (e.g., 2.5V) at the comparator 711 and compared with a second nominal threshold voltage V2 (e.g., 20 mV) at the comparator 709. The comparing result of the comparator 709 and the skip signal 428 are provided to the NAND gate 715 to produce the LDR_EN signal 407. The comparing result of the comparator 711 is provided to a reset (R) terminal of the flip-flop 729. The comparing results of the comparators 709, 717 and 719 are provided to a set (S) terminal of the flip-flop 729 via the AND gate 727. Based on the signals at the set and reset terminals, the flip-flop 729 generates the PWM signal 405.

In operation, the voltage across the energy storage element 707 is initially set to zero volts and the PWM signal 405 is initially logic 0. When the controller 420 is enabled, the voltage at the SLEW terminal will begin to increase from zero volts to the target voltage level Vslew due to the charge process of the slew capacitor 422, resulting in a slew signal 429 greater than the feedback signal 421 representative of the output voltage VOUT. As such, the comparing result of the comparator 717 is logic 1. Meanwhile, since there is no current flowing through the inductor 106, an over current condition is not sensed such that the comparing result of the comparator 719 is set to logic 1. In addition, the switch 723 is currently turned off by the PWM signal 405 such that the energy storage element 707 is discharged to zero volts by the current source 701. As such, the comparing result of the comparator 709 is set to logic 1 while the comparing result of the comparator 711 is set to logic 0. In response to these comparing results of the comparators 709, 711, 717 and 719, the R and S terminals of the flip-flop 729 are set to logic 0 and logic 1, respectively, resulting in logic 1 and logic 0 at the Q and QB terminals, respectively.

In this instance, the PWM signal 405 becomes logic 1 and the switch 723 is turned on in response to the logic 1 PWM signal 405. Concurrently, the switch 725 is turned off due to the logic 0 signal at the QB terminal. When the switch 723 is turned on, the energy storage element 707 is charged by a current equal to the current I2 less the current I1. As mentioned above, the current I1 may be representative of the output voltage VOUT or the target voltage level Vslew. The current I2 may be representative of the input voltage VIN. As such, the energy storage element 707 is charged by a current level proportional to (VIN−VOUT) or (VIN−Vslew).

During the charging process, the comparator 711 compares the voltage across the energy storage element 707 with the first nominal threshold voltage V1 and provides the comparing result to the R terminal of the flip-flop 729. Once the voltage across the energy storage element 707 exceeds the first nominal threshold voltage V1, the comparing result is set to logic 1 and the flip-flop 729 is reset, resulting in logic 0 and logic 1 at the Q and QB terminals, respectively. As such, the PWM signal 405 becomes logic zero and the switch 723 is turned off accordingly. At that moment, the energy storage element 707 is not charged any more but discharged through the current source 701.

During the discharging process, accelerated discharge of the energy storage element 707 may occur if the switch 725 is turned on. With the accelerated discharge process, the energy storage element 707 can be discharged simultaneously through the current source 701 and the current source 705. As discussed above, the switch 725 is controlled by the logic level at the QB terminal, the comparing result of the comparator 717 and the shutdown signal 403. The logic level at the QB terminal ensures that the accelerated discharge is enabled only during the discharging process. The shutdown signal 403 ensures that the accelerated discharge is enabled only in the normal operation mode. The comparing result of the comparator 717 allows the energy storage element 707 to discharge at a normal rate or an accelerated rate when the controller 420 operates in the normal operation mode. As the energy storage element 707 can be discharged at the normal or accelerated rate, the controller 420 can in turn switch the first and second switches 305 and 307 at a normal frequency or an accelerated frequency in the normal operation mode. However, the accelerated frequency is undesirable in the shutdown mode since the accelerated frequency can cause increased power loss and degraded energy recovery efficiency. As a result, the accelerated discharge process is disabled by the shutdown signal 403 in the shutdown mode such that the controller 420 will control the first and second switches 305 and 307 at the normal frequency.

Regardless of which discharge rate is used during the discharging process, the comparator 709 compares the voltage across the energy storage element 707 with the second nominal threshold voltage V2 and provides the comparing result to the S terminal of the flip-flop 729 via the AND gate 727. Once the voltage on the energy storage element 707 is discharged to a value less than the second nominal threshold voltage V2, the comparing result is set to logic 1 and the flip-flop 729 is set, resulting in logic 1 and logic 0 at the Q and QB terminals, respectively. As such, the PWM signal 405 becomes logic 1 and the switch 723 is turned on accordingly. At that moment, the energy storage element 707 is not discharged any more but charged by the current equal to the current I2 less the current I1.

In this way, the controller 420 provides the PWM signal 405 and LDR_EN signal 407 to the driver 430, which in turn controls operation of the buck converter 410. In particular, the controller 420 can disable the accelerated frequency of the first and second switches 305 and 307 to avoid additional power loss in the shutdown mode.

Figure 8:
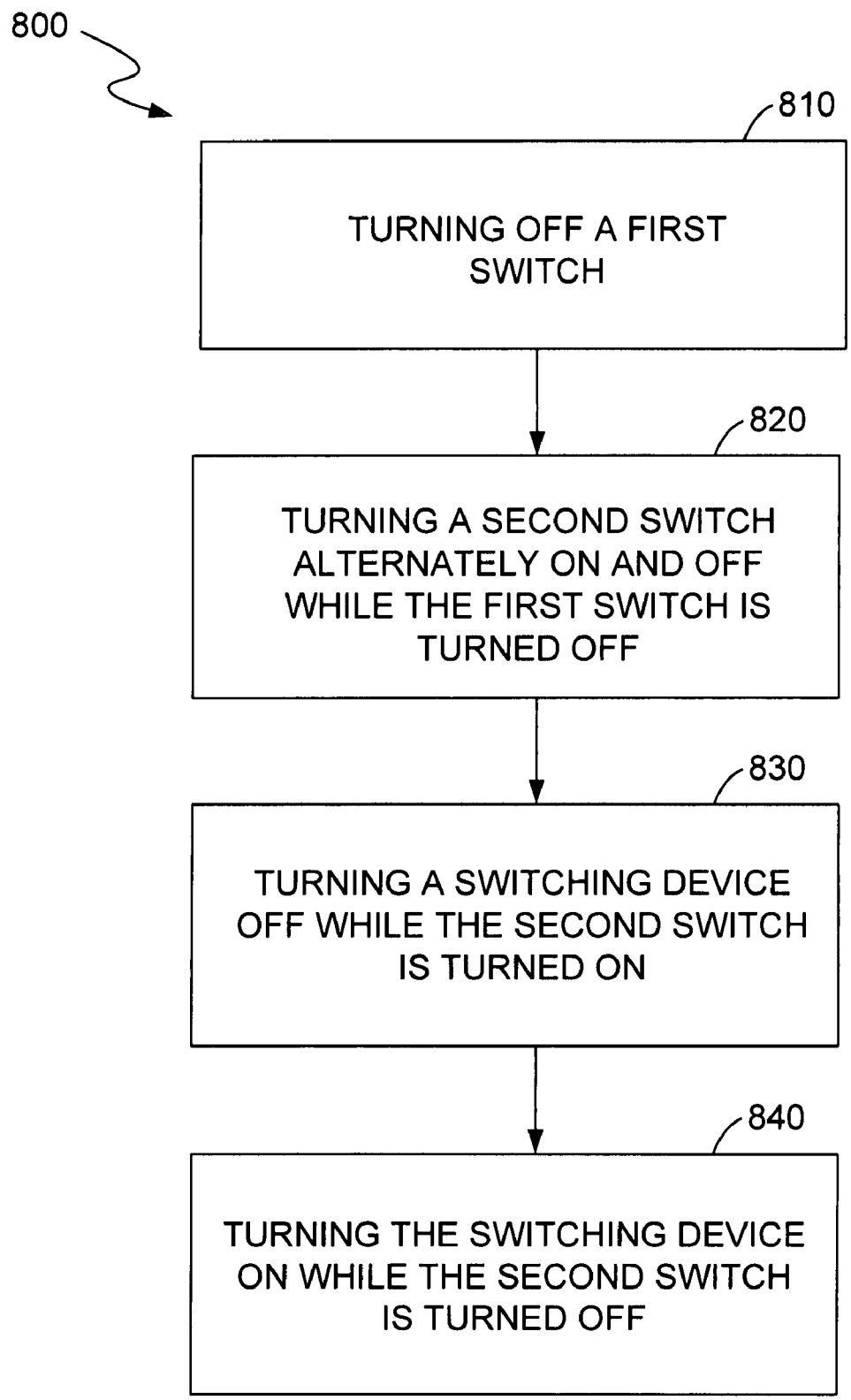
FIG. 8 is a flow chart of a method for controlling a converter according to one embodiment of the present invention.

FIG. 8 is a flow chart 800 of a method for operating a converter. FIG. 8 is described in combination with FIG. 4. Although specific steps are disclosed in FIG. 8, such steps are exemplary. That is, the present invention is well suited to performing various other steps or variations of the steps recited in FIG. 8.

In block 810, a first switch is turned off. For example, the first switch 305 is turned off when the buck converter 410 operates in the shutdown mode. In block 820, a second switch is turned alternately on and off in response to a switch control signal while the first switch is turned off. For example, while the first switch 305 remains off during the shutdown mode, the second switch 307 is turned alternately on and off in response to the PWM signal 405.

The method may further include steps as illustrated in block 830 and 840. In block 830, a switching device is turned off while the second switch is turned on. For example, while the second switch 307 is turned on in the shutdown mode, the switching device, e.g., the diode 301, is turned off by being reverse-biased. In block 840, the switching device is turned on while the second switch is turned off. For example, while the second switch 307 is turned off in the shutdown mode, the switching device, e.g., the diode 301, is turned on by being forward-biased.

Figure 9:
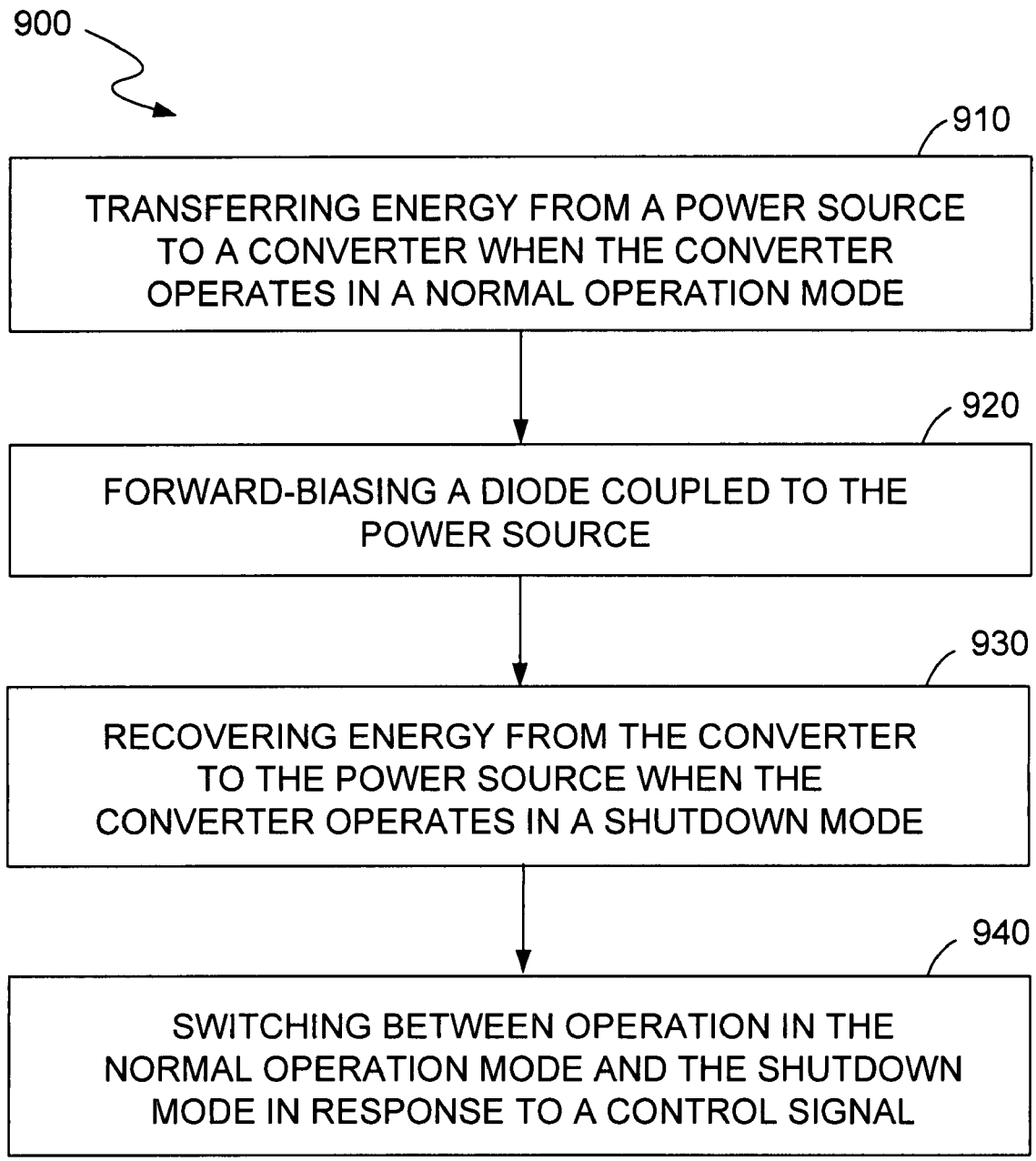
FIG. 9 is a flow chart of a method for controlling a converter capable of operating in a normal operation mode and a shutdown mode according to one embodiment of the present invention.

FIG. 9 is a flow chart 900 of a method for operating a converter. FIG. 9 is described in combination with FIG. 4. Although specific steps are disclosed in FIG. 9, such steps are exemplary. That is, the present invention is well suited to performing various other steps or variations of the steps recited in FIG. 9.

In block 910, energy is transferred from a power source to the converter when the converter operates in the normal operation mode. For example, the buck converter 410 can operate in either the normal operation mode or the shutdown mode. While the buck converter 410 operates in the normal operation mode, energy from the battery 340 is transferred to the buck converter 410 by turning the first and second switches 305 and 307 alternately on or off.

In block 920, a diode coupled to the power source is forward-biased. For example, the diode 301 is forward-biased while the first switch 305 remains off and the second switch 307 is also turned off.

In block 930, energy is recovered from the converter to the power source when the converter operates in the shutdown mode. For example, while the first switch 305 remains off and the second switch 307 is also turned off, energy stored in the inductor 309 and the output capacitor 311 will be recovered to the battery 340 via the forward-biased diode 301.

In block 940, the converter is switched between operating in the normal operation mode and the shutdown mode in response to a control signal. For example, the buck converter 410 can operate in either the normal operation mode or the shutdown mode in response to the shutdown signal 403.

Additionally, the method and circuit as discussed above can be similarly applied to converters with other topologies, such as a boost converter and a buck/bust converter, which will not be described herein for the purpose of brevity. Also, the diode can be replaced by various known elements encompassing the functionality similar to the diode.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for operating a converter, said method comprising:

transferring energy from a power source to said converter while said converter operates in a normal operation mode;

forward-biasing a diode coupled to said power source;

recovering energy from said converter to said power source via said forward-biased diode while said converter operates in a shutdown mode; and switching between operation in said normal operation mode and said shutdown mode in response to a control signal.

2. The method of claim 1, wherein said converter operates at a plurality of frequencies including a normal frequency and an accelerated frequency.

3. The method of claim 2, wherein said converter operates at said normal frequency in said shutdown mode.

4. The method of claim 1, further comprising:

turning a first switch coupled to said power source off while said converter operates in said shutdown mode; and turning a second switch coupled to ground alternately on and off while said first switch is turned off.

5. The method of claim 4, wherein said diode is a body diode of said first switch.

6. The method of claim 4, wherein said diode is coupled in parallel with said first switch.

7. The method of claim 1, further comprising:

reverse-biasing said diode; and terminating energy transfer from said power source to said converter via said reverse-biased diode while said converter operates in said shutdown mode.

8. A circuit comprising:

a converter having a normal operation mode and a shutdown mode, wherein energy is transferred from a power source to said converter while said converter operates in said normal operation mode;

a diode coupled to said power source; and a converter controller coupled to said converter for receiving a control signal and switching said converter between operation in said normal operation mode and operation in said shutdown mode in response to said control signal, wherein energy is recovered from said converter to said power source by forward biasing said diode while said converter operates in said shutdown mode.

9. The circuit of claim 8, wherein said converter further comprises:

a first switch coupled to said power source; and a second switch coupled between said first switch and ground, wherein said second switch is turned on and off alternately while said first switch is turned off.

10. The circuit of claim 9, wherein said diode is a body diode of said first switch, and wherein said body diode is reverse-biased to terminate said energy transfer from said power source to said converter.

11. The circuit of claim 9, wherein said diode is coupled in parallel with said first switch, and wherein said diode is reverse-biased to terminate said energy transfer from said power source to said converter.

12. The circuit of claim 8, wherein said converter controller generates a pulse width modulation (PWM) signal to control operation of said converter in said shutdown mode.

* * * * *